United States Patent [19]

Suzuki

[11] Patent Number: 4,772,958
[45] Date of Patent: Sep. 20, 1988

[54] IMAGE READING DEVICE
[75] Inventor: Yoshiyuki Suzuki, Yokohama, Japan
[73] Assignee: Canon Kabushiki Kaisha, Tokyo, Japan
[21] Appl. No.: 98,733
[22] Filed: Sep. 16, 1987

Related U.S. Application Data

[63] Continuation of Ser. No. 678,410, Dec. 5, 1984, abandoned.

[30] Foreign Application Priority Data

Dec. 9, 1983 [JP] Japan .................. 58-231360

[51] Int. Cl.⁴ .......................................... H04N 1/024
[52] U.S. Cl. .................................. 358/294; 358/280; 358/282; 358/213.22
[58] Field of Search ............... 358/280, 282, 293, 294, 358/213.22, 213.15; 250/578

[56] References Cited

U.S. PATENT DOCUMENTS 4,408,231 10/1983 Bushaw et al. ................ 358/280
4,589,034 5/1986 Yokomizo .

Primary Examiner—Edward L. Coles, Sr.
Attorney, Agent, or Firm—Fitzpatrick, Cella, Harper & Scinto

[57] ABSTRACT

An image reading sensor utilizes a linear CCD array, in which odd cells and even cells respectively provide two series of signals. These two series are processed separately and brought to a mutually equal level, so that they constitute a uniform image signal when synthesized together, with reduced deterioration in image quality.

8 Claims, 3 Drawing Sheets

IMAGE READING DEVICE

This application is a continuation of application Ser. No. 678,410 filed Dec. 5, 1984, now abandoned.

BACKGROUND OF THE INVENTION

1. Field of the Invention

The present invention relates to an image reading device equipped with a linear sensor array.

2. Description of the Prior Art

Charge-coupled device (CCD) has been employed as a linear image sensor in the image reading device for use in a facsimile, a copier or the like. Such CCD image sensor is generally composed of a photoelectric converting section for example with plural photodiodes for generating electric charges in response to incident light, a transfer section for accumulating said charges and transferring them to an output section, and an output section provided with a transistor for converting thus transferred charges into voltage signals.

For reading a large original image with a high resolution power, there is required a CCD having a large number of cells and capable of high speed charge transfer. Consequently the transfer section of CCD is often divided into two channels respectively corresponding to even and odd photodiodes.

FIG. 1 shows such conventional linear image sensor comprising a photoelectric converting section PD having plural photodiodes; a charge transfer section CCD A corresponding to odd photodiodes; a charge transfer section CCD B corresponding to even photodiodes; and an output section 0, wherein a continuous video signal V of a scanning line is obtained by synthesizing signals transferred in two separate channels respectively through CCD A and CCD B into one channel in said output section 0.

Such linear image sensor having two CCD channels can achieve an improved efficiency, since each cell C in the CCD channels can be doubled in size and the number of cells in each channel as well as the signal transfer rate in each channel can be halved in comparison with the case of transferring all the pixels through a single CCD channel.

However, in the image reading device equipped with the CCD image sensor shown in FIG. 1, the signals generated by the odd photodiodes and those generated by the even photodiodes are transferred respectively in different channels CCD A and CCD B, so that there may result a difference between the levels of the video signal corresponding to the odd pixels and that corresponding to the even pixels, due to a difference between the characteristics of said CCD channels. Such a difference in the levels of the video signals V results in a deterioration of the reproduced image.

Also the image signal synthesized in the output section 0 requires the use of circuit components, such as amplifiers and A/D converters, of a large band width, and this fact inevitably raises the cost of the image reading device and limits the image reading speed thereof.

SUMMARY OF THE INVENTION

In consideration of the foregoing, an object of the present invention is to provide an image reading device capable of high-speed image reading with a high resolution power.

Another object of the present invention is to provide an image reading device capable of forming a satisfactory image signal of a high resolution power.

Still another object of the present invention is to provide an image reading device capable of effectively correcting unevenness in the level of the image signal.

Still another object of the present invention is to provide an image reading device adapted for use in a copier in which satisfactory image reproduction is desired. According to the present invention, the foregoing objects are achieved by an image reading device in which an image sensor, comprising a linear sensor array and output means which outputs first and second image data corresponding respectively to odd and even elements of the sensor, outputs data to first and second processing means (e.g., means for correcting level differences), after which the processed first and second data are synthesized.

The foregoing and still other objects of the present invention, and the advantages thereof, will become fully apparent from the following description.

DETAILED DESCRIPTION OF THE PREFERRED EMBODIMENTS

Now the present invention will be clarified in detail by embodiments thereof shown in the attached drawings.

Figure 2:
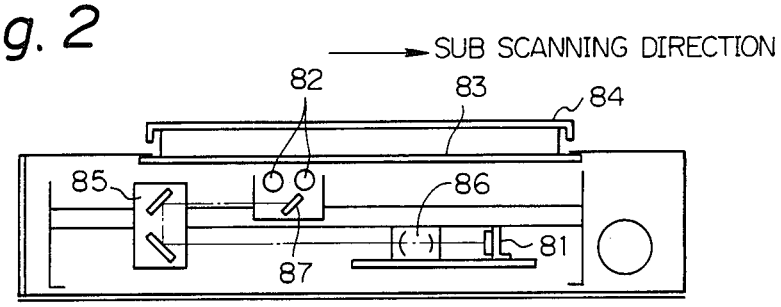
FIG. 2 is a cross-sectional view of an image reading device embodying the present invention.

FIG. 2 shows the structure of an image reading device of the present invention, which is applicable to a facsimile, copier, electronic file or the like. In FIG. 2, an original document to be read is placed, with the image bearing face thereof downwards, on an original supporting glass 83, at the far left corner thereof when seen from the front side of the device, and is pressed against said glass by means of an original cover 84. The original is illuminated by a fluorescent lamp 82, and there is provided an optical path for guiding the reflected light from the original to a linear image sensor 81 through mirrors 85, 87 and a lens 86, wherein said mirrors 87 and 85 move with a speed ratio of 2:1. The above-described optical unit is displaced by a DC servo motor at a constant speed from left to right to achieve subsidiary scanning with a resolution power of 16 lines/mm. The image reading device can read originals of sizes from A5 to A3, among which the sizes A5, B5 and A4 are placed in a longitudinally oblong position while the sizes B4 and A3 are placed in a laterally oblong position when seen from the front side.

The main scanning width of the linear image sensor 81 is 297 mm, corresponding to the longer side of A4 size placed as explained before. In order to read said width with a resolution power of 16 pixels/mm, there are required at least $297 \times 16 = 4752$ bits in the linear image sensor 81.

Figure 1:
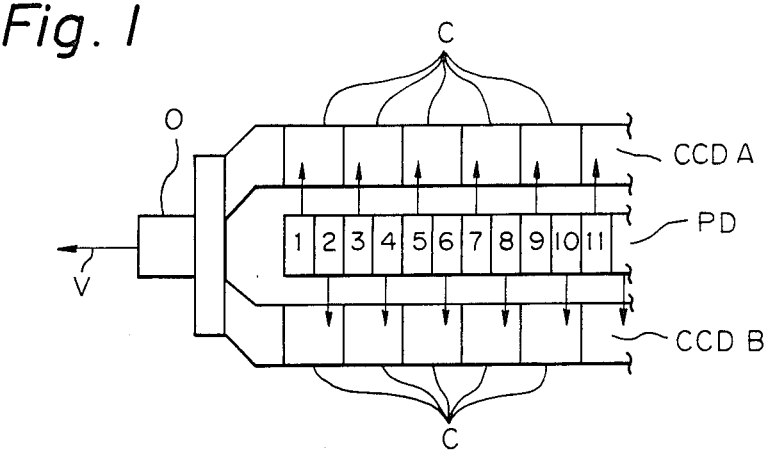
FIG. 1 is a schematic view of a linear image sensor in a conventional image reading device.
Figure 3:
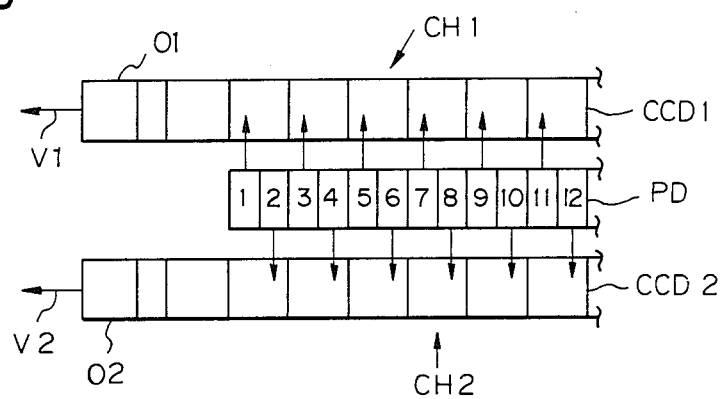
FIG. 3 is a schematic view of an embodiment of a linear image sensor of the image reading device of the present invention.

FIG. 3 shows an embodiment of the linear image sensor of the present invention, comprising a photoelectric converting section PD which is similar to that shown in FIG. 1 and composed of ca. 5,000 photodiodes; and CCD channels CCD1 and CCD2 respectively corresponding to odd and even photodiodes and adapted for transferring accumulated charges to separate output sections 01, 02, which convert thus transferred charges into voltage signals to generate video signals V1, V2 respectively. In the following explanation, the CCD1 and 01 will be called a first channel CH1, while the CCD2 and 02 will be called a second channel CH2.

In this manner the output signals of the channels CCD1, CCD2 respectively corresponding to the odd and even photodiodes are separately supplied, without synthesizing, to two output sections 01, 02 and released therefrom.

Figure 4:
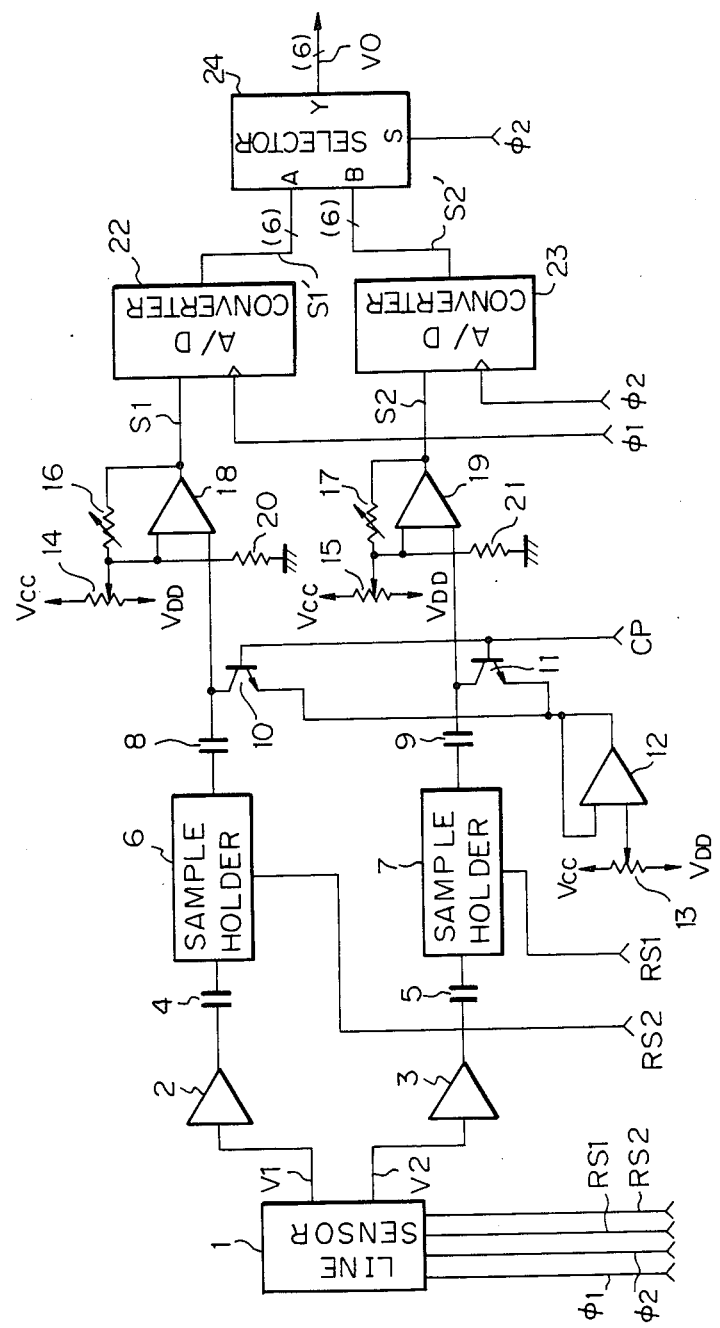
FIG. 4 is a block diagram showing an embodiment of a correcting circuit of the present invention.

FIG. 4 shows an embodiment of a correcting circuit of the present invention, wherein a linear image sensor 1 corresponding to that shown in FIG. 3 releases, in response to CCD driving clock signals $\phi 1$, $\phi 2$ which are mutually 180° apart, video signals V1 and V2 respectively corresponding to the odd and even photodiodes. Reset signals RS1 and RS2 are respectively supplied to the output sections 01, 02 of the linear image sensor 1 for resetting the channels CH1, CH2. Said reset signal RS1 or RS2 assumes the high level state during the low level state of the clock signal $\phi 1$ or $\phi 2$ respectively. There are also provided amplifiers 2, 3 for respectively amplifying the video signals V1, V2 released by the linear image sensor 1; condensers 4, 5 for AC connection for thus amplified signals; and sample holders 6, 7 which respectively receive, as sampling signals, the reset signals RS2 and RS1 supplied to the output sections of the linear image sensor 1, since the effective output periods of the channels CH1 and CH2 respectively coincide with the durations of the reset signals RS2 and RS1. Naturally said sampling signals may be generated separately from the reset signals. Further there are provided condensers 8, 9 for AC connection for the output signals of the sample holders 6, 7.

Transistors 10, 11 are used for clamping the black level signals supplied from the channels CCD1 and CCD2, and the clamp level can be set by a variable resistor 13 for black level setting and an operational amplifier 12 functioning as a voltage follower. For example a part of photodiodes PD, such as excessive ones not used in image reading in 5,000 photodiodes, is optically shielded and is used as a reference for black level signal, and the clamp signal CP is supplied to the bases of the transistors 10, 11 in synchronization with the output timing of the black level signal corresponding to said part thereby matching the black level of the channel CCD1 with that of the other channel CCD2.

There are further shown video amplifiers 18, 19 respectively connected to condensers 8, 9; variable resistors 14, 15 for regulating offset values of the video signals; and variable resistor 16, 17 for regulating gains of the video amplifiers 18, 19, and the two channels can be balanced by appropriate setting of said variable resistors.

The video signals S1, S2 released from the video amplifiers 18, 19 are respectively supplied to A/D converters 22, 23 for encoding into digital signals S1', S2' for example of 6 bits representing the density level of the image. The A/D converters 22, 23 respectively receive clock signals $\phi 1$ and $\phi 2$ mutually different by 180° in phase and release the signals S1' and S2' respectively in synchronization with said clock signals $\phi 1$ and $\phi 2$.

A selector 24, in response for example to the clock signal $\phi 2$ as a selecting signal, alternately selects the signals S1' and S2' and synthesizes them into a video signal V0 of one channel.

Figure 5:
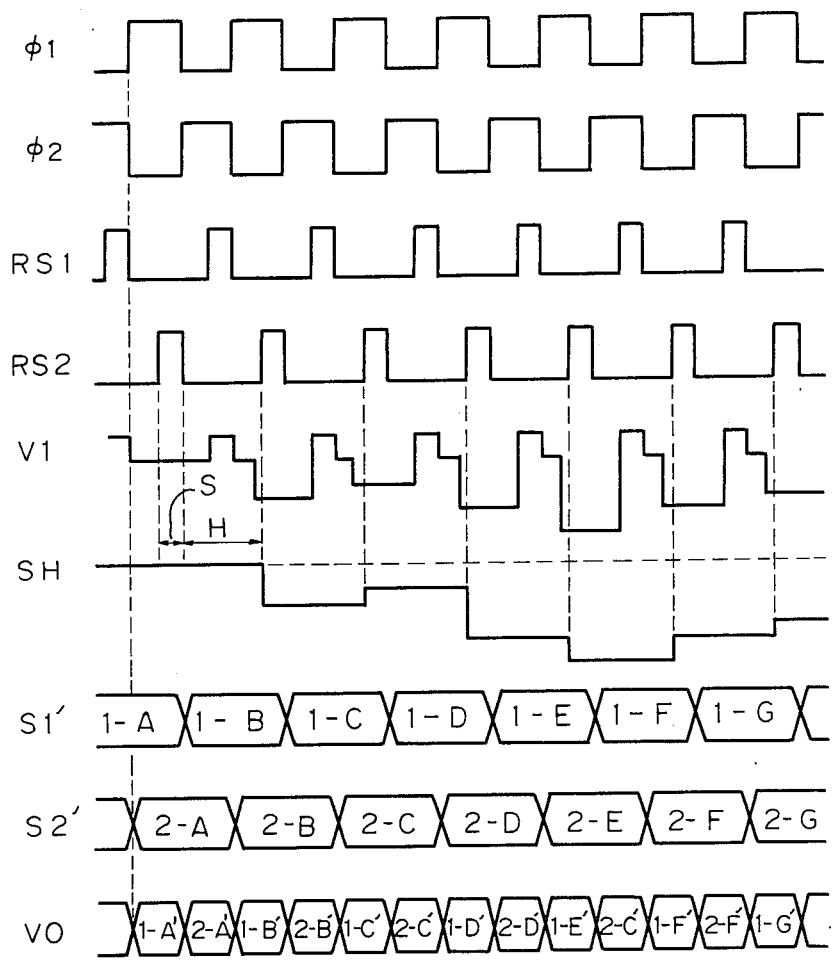
FIG. 5 is a timing chart showing various signals in the correcting circuit shown in FIG. 4.

FIG. 5 is a timing chart showing the above-mentioned signals, wherein SH indicates the output signal of the sample holder 6, obtained by sample-holding of the output signal V1 of the channel CH1 in response to the reset signal RS2, and S and H respectively represent the sampling period and the holding period by the reset signal RS2. Also 1-A, 1-B, ... and 2-A, 2-B, ... respectively indicate 8-bit digital signals S1', S2' released from the A/D converters 22, 23 in synchronization with the cycles of the clock signals $\phi 1$, $\phi 2$ mutually displaced by 180° in phase.

As shown in FIG. 5, the signals 1-A, 1-B, ... and the signals 2-A, 2-B, ... can be synthesized as 1-A', 2-A', 1-B', 2-B', ... constituting a continuous video signal V0 of a line, since the selector 24 releases the signal S1' or S2' respectively when the clock signal $\phi 2$ is at the low or high level state.

The continuous video signal V0 of a line formed in this manner is then supplied to a succeeding processing circuit for printout on a printer, for storage in an electronic file or for transmission to a distant location through a transmission channel.

In the foregoing embodiment the synthesis of video signals of two channels is conducted after the output signals of the linear image sensors are converted into 6-bit digital signals, but it can also be conducted even later, for example after the 6-bit digital signals are converted into binary image signals. In other words, the synthesis should be conducted after the unevenness is removed from the signals of two channels separately released from the linear image sensors.

As explained in the foregoing, the synthesis of the image signals of two channels after respective corrections provides a uniform image signal, thus providing an image reading device capable of avoiding deterioration in the reproduced image. Also the frequency of the signals bearing the image information prior to the signal synthesis is halved in comparison with conventional devices, so that the image reading device can be constructed inexpensively with circuit components such as video amplifiers, A/D converters, etc. of a narrower band width. In addition the image reading speed, which has been limited by the frequency band width of such components, can now be increased.

What is claimed is:

1. An image reading device comprising:
    an image sensor comprising a linear array of plural photosensor elements and output means for separately outputting first and second image data respectively corresponding to odd photosensor elements and to even photosensor elements of said image sensor;
    first and second amplifying means for amplifying respectively the first and second image data separately outputted from said output means;
    first and second converting means for converting the first and second image data amplified by said first and second amplifying means, respectively, into first and second digital image data; and
    means for alternately selecting amplified, converted digital image data from said first and second digital image data, and for forming sequential digital image data corresponding to said array of plural photosensor elements.

2. An image reading device according to claim 1, wherein said output means is adapted to output said first and second image data at mutually different phases.

3. An image reading device according to claim 1, further comprising first and second processing means for processing said first and second image data such that the respective black levels thereof coincide.

4. An image reading device according to claim 1, wherein said image sensor comprises first and second memory means for separately storing said first and second image data and said output means is adapted to output the first and second image data respectively stored in said first and second memory means.

5. An image reading device according to claim 1, further comprising first and second holding means for synchronously holding the respective first and second image data selectively output from said output means.

6. An image reading device according to claim 1, wherein said first and second converting means perform the converting operation at a speed lower than the output speed of the image data of said sequential digital image data forming means.

7. An image reading device according to claim 1, further comprising first and second correcting means for correcting level differences between said first and second image data.

8. An image reading device according to claim 7, wherein said first and second correcting means respectively comprise first and second level amplifying means for amplifying the first and second image data with mutually different gains.

* * * * *

UNITED STATES PATENT AND TRADEMARK OFFICE
CERTIFICATE OF CORRECTION

PATENT NO. : 4,772,958
DATED : September 20, 1988
INVENTOR(S) : YOSHIYUKI SUZUKI It is certified that error appears in the above-identified patent and that said Letters Patent is hereby corrected as shown below:

COLUMN 2

Line 10, "sired. According" should read
--sired. ¶ According--.

Signed and Sealed this

Eleventh Day of April, 1989

Attest:

DONALD J. QUIGG

Attesting Officer

Commissioner of Patents and Trademarks